United States Patent
Conner

(10) Patent No.: US 9,586,701 B2
(45) Date of Patent: Mar. 7, 2017

(54) ELECTRON PROPULSION ENGINE

(71) Applicant: Paul Howard Conner, Roanoke, VA (US)

(72) Inventor: Paul Howard Conner, Roanoke, VA (US)

( * ) Notice: Subject to any disclaimer, the term of this patent is extended or adjusted under 35 U.S.C. 154(b) by 632 days.

(21) Appl. No.: 14/084,643

(22) Filed: Nov. 20, 2013

(65) Prior Publication Data

US 2014/0223883 A1 Aug. 14, 2014

Related U.S. Application Data

(60) Provisional application No. 61/850,237, filed on Feb. 11, 2013.

(51) Int. Cl.
*B64G 1/40* (2006.01)
*F03H 99/00* (2009.01)
*F03H 1/00* (2006.01)

(52) U.S. Cl.
CPC ........... *B64G 1/405* (2013.01); *F03H 1/0012* (2013.01); *F03H 1/0025* (2013.01); *F03H 99/00* (2013.01)

(58) Field of Classification Search
CPC ....... F03H 1/0012; F03H 1/0025; F03H 99/00
See application file for complete search history.

(56) References Cited

U.S. PATENT DOCUMENTS 5,546,743 A * 8/1996 Conner .................... H05H 9/00
315/505
6,154,383 A * 11/2000 Cardwell, Jr. ......... H02M 3/337
363/41

OTHER PUBLICATIONS

Hall Thruster Project, 2005, https://web.archive.org/web/20050615082137/http://w3.pppl.gov/~fisch/hall_thruster_project4.htm.*

* cited by examiner

*Primary Examiner* — Gerald L Sung
*Assistant Examiner* — William Breazeal

(57) ABSTRACT

An electron acceleration device using thermionic fission cells and an electromagnetic scoop coil for power. A power control junction and electron injector control that feeds free electrons in packets into the acceleration components that consist of a series of induction linac module units, having quadrupole magnet units in series between the induction module units. Has on-board xenon gas for a deep space electron source. At the high speed electrons exit from the device, deflector plates control the exit path of the electrons to direct the course of a craft.

11 Claims, 1 Drawing Sheet

ELECTRON PROPULSION ENGINE

CROSS-REFERENCE TO RELATED APPLICATIONS

This application is related to my U.S. provisional patent application 61/850,237, Electron Propulsion Engine, filed on Feb. 11, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

Field of the Invention

The invention is directed to an Electron Propulsion Engine that takes free electron packets and accelerates them for the purpose of creating a force by electromagnetic fields for use as propulsion means for a craft.

Description of the Related Art

My patent for the Electron Propulsion Unit (U.S. Pat. No. 5,546,743, issued Aug. 20, 1996), had claims as to a mechanical embodiment independent of the propulsion process. Since the granting of this patent I have made improvements to the mechanical embodiment, and substantially refined the process. The original patent stated two possible applications, whereas now I have added an additional application, resulting in three primary, groundbreaking applications. I believe upgrades in the areas of mechanics, process, and application justify a new patent.

BRIEF SUMMARY OF THE INVENTION

Electron Propulsion Engine (EPE) produces a 10 million Newton constant thrust, with a non-prohibitive power plant mass. The engine is designed to operate in two different environments: orbital space (LEO) and interplanetary space. In both environments the applicable vehicle remains spacecraft charge neutral. The performance envelope of EPE will allow it to produce a constant 1 g force (1 Earth gravity) acceleration. This makes it ideal for use as both a manned or unmanned space vehicle.

This performance level can be applied to three novel applications. A high-performance spacecraft, an Earth-saving asteroid/comet destroying kinetic energy missile, and a gravity telescope capable of solving the greatest challenges of modern science.

As a manned spacecraft, it can provide its own thrust generated gravity. As a kinetic energy missile it can deliver over a hundred million megatons to completely vaporize an asteroid/comet that threatens the Earth. As a gravity telescope propulsion means, it can allow for the direct viewing of exoplanets and aid research into dark energy, with utilization of the equivalent telescope lens diameter of a million miles.

DETAILED DESCRIPTION OF THE INVENTION

Theoretical Concept

Figure 1:
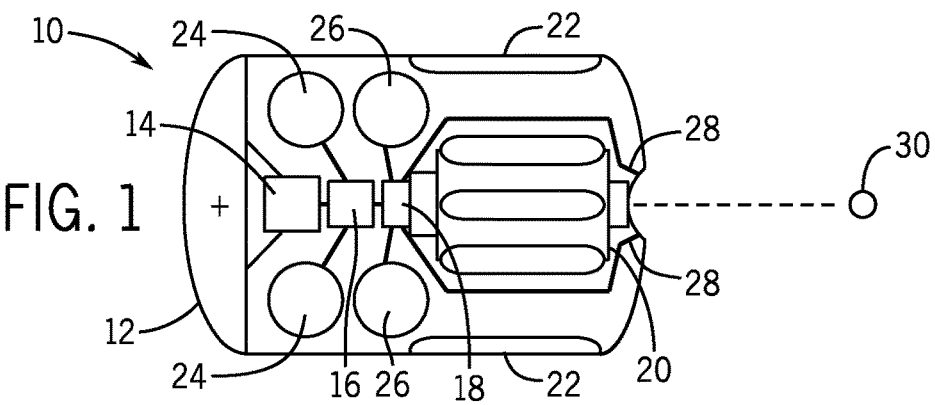
FIG. 1. is a side schematic view of the Electron Propulsion Engine.

Performance: Electron Propulsion Engine (EPE) produces a 10 million Newton constant thrust, with a non-prohibitive power plant mass. The most important point about EPE is that electrons are being accelerated in packets of 1 C (Coulomb), which is dissimilar to all forms of electric propulsion known to date. As such it yields a different outcome.

Thrust: I have never liked doing comparisons with ion propulsion, however it is the simplest way to illustrate the performance opportunity of EPE. Given that it is unavoidable, the following is an accurate description of NASA's Deep Space-1 probe thrust.

$$q = \dot{q}t = (1 \text{ C/s})(10^{-7} \text{ s}) = 10^{-7} \text{ C}$$

$$F = qE = (10^{-7} \text{ C})(10^6 \text{ N/C}) = 10^{-1} \text{ N}$$

My engine is a novel approach to well established physics. In accordance with Newton's second law of motion, if an electron's finite mass of about $9.1 \times 10^{-31}$ kg is to be accelerated, it will require a force. Newton's third law of motion states that forces must always exist in pairs, which are equal in magnitude and opposite in direction.

As stated before the electrons will be accelerated in packets, not individually. At a scale of 1 C per packet, new properties immerge. Causal is the Child-Langmuir relation below (where I is current and V is voltage):

$$I \alpha V^{3/2}$$

In the presents of an accelerating field of strength $9.8 \times 10^6$ N/C the periphery of the non-neutral EPE electron packet "cloud" will shield the bulk of the electrons from the accelerating field. An electrostatic field is generated by the expanding 1 C packet. This is an internal symmetric field, so it cannot oppose the external field. I have concluded that the resulting acceleration should be near 0 m/s$^2$ on the 1 C packet, but not equal to zero. However, as stated above, the packet will be expanding, rounding by order of magnitude, at a rate of 100 m/s.

4-pole magnetic fields can keep the electron bunch focused as it progresses in its acceleration, also referred to as quadrupole magnets, thus controlling the electrons' repulsive force. The electrons will follow a linear path through the linear accelerator, until they are exhausted to space via an exhaust port. With an accelerator length of 1 m, and a travel rate of 100 m/s, a 1 C electron packet will be in instantaneous residence for a period of 1/100 of a second. Thus, 1 C can be maintained in continuous instantaneous residence by injecting 100 C/s.

It has been verified that independent of the resultant particle packet acceleration, that the force placed on the packet can only be defined by the equation F=qE, F (force)= q (total instantaneous charge) times E (electric field). Thus you get the following:

$$q = \dot{q}t = (10^2 \text{ C/s})(10^{-2} \text{ s}) = 1 \text{ C}$$

$$F = qE = (1 \text{ C})(10^7 \text{ N/C}) = 10^7 \text{ N}$$

If the vehicle is placing a force on the particle packet, F=qE, than an absolutely equal force must be applied to the vehicle. I have already proven that the "action" force of the action-reaction pair will equal 10 million Newtons of force. Thus, if this force is not reacted by 10 million Newtons of force, it will be in violation of Newton's third law of motion.

Restated: Sir Isaac Newton's third law of motion states that forces must always exist in pairs, which are equal in magnitude and opposite in direction. This is not open to interpretation! Any "action" force must be "reacted" by the vehicle. This is clearly the most powerful in-space propulsion system ever realistically proposed.

Fuel: The engine is designed to operate in two different environments: orbital space (LEO) and interplanetary space. The difference between one and the other is the external ambient electron density.

Given that a LEO particle density (of electrons) is around $10^{13}$ m$^{-3}$, at a particle velocity of 7,800 m/s, there exists sufficient ambient electron flux for EPE to operate at 1 C/s in LEO space. The collection surface will use an applied magnetic field to funnel particles toward the spacecraft. The magnetic field will be able to "suck" them in from a number of meters from the spacecraft. External collection can be continued until the vehicle reaches Earth's "escape velocity," which is about 10 km/s. If you took a hemispherical dome, described by the equation A=½(4πr$^2$), you could create a frontal collecting surface with an area of 157 m$^2$, with a diameter of 10 m. The 10 m diameter surface is doable with today's deployable structures.

Note, that for a 100 C/s vehicle, there is only ¹⁄₁₀₀ of the "fuel" needed to have a sizable craft operate at maximum thrust. However, there is enough for adequate partial thrust (while in the Earth's magnetosphere).

Given that interplanetary space electron density hovers around 5×10$^6$ m$^{-3}$, with a particle velocity of 400 km/s, for the inter solar system, there is insufficient ambient electron flux for EPE to operate at 1 C/s in interplanetary space. However, in this environment an internal electron "fuel" source is applicable, thus low electron particle density does not prevent operation of EPE. The idea is to ionize xenon gas, which will be stored on the spacecraft, using power from the thermionic fission cells, which is the engine's internal power source. It should be noted that an alternative power source can be microwaves beamed in from a distant source. The freed electrons will be used by the electron injector and the ions will be applied to other work. With an output of 100 C/s, I believe it will only require 400 kg of Xe per month. This is based on the knowledge the Xe has a mass of 2×10$^{-25}$ kg and a charge of 1.6×10$^{-19}$ C per particle.

Figure 2:
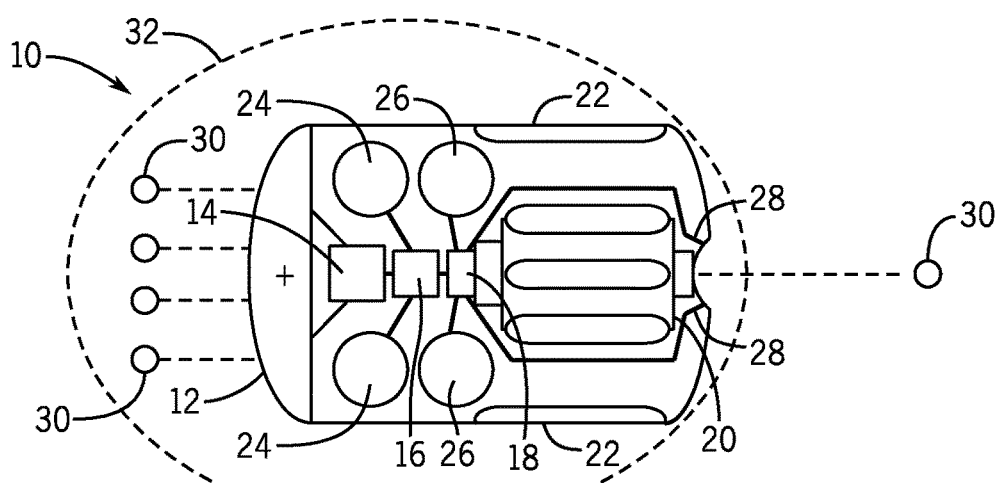
FIG. 2. is a side schematic view of the Electron Propulsion Engine in orbital space (LEO).

Spacecraft Charging: My spacecraft neutralization plan for LEO, where the required electrons 30 for propellant can be acquired from the outside environment, is quite simple. If the same number of electrons 30 enter and leave the spacecraft, concurrently, then no spacecraft charging will occur (equal electrons in+equal electrons out=spacecraft neutrality). Refer to FIG. 2.

Figure 3:
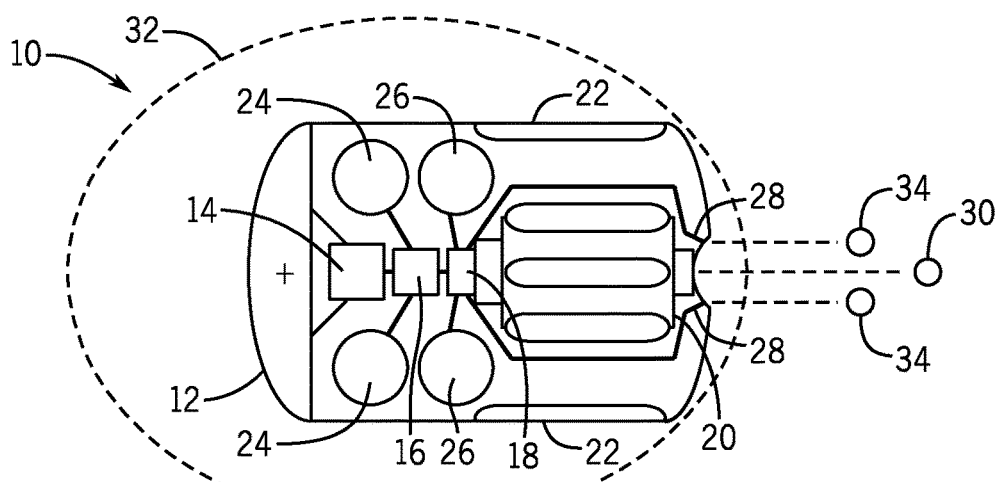
FIG. 3. is a side schematic view of the Electron Propulsion Engine in interplanetary space.

My spacecraft neutralization plan for interplanetary space, where xenon 26 is used to generate the electron "fuel" internally, is based on the fact that xenon ions 34 are charge positive and electrons 30 are charge negative (equal positive+equal negative=spacecraft neutrality). Thus, I am going to throw the xenon ions 34 overboard (the "other work" I mentioned a moment ago). Timed discharge of alternately positive then negative particles will work, as long as the net charge emitted over time is zero. Refer to FIG. 3.

Mechanical Embodiment

This is a list of what comprises an Electron Propulsion Engine 10. Refer to FIG. 1. Electron Collection Surface 12: 157 m$^2$ equals 1 C/s in LEO (Low Earth Orbit). Electromagnet 14: will charge the collection surface. Electromagnetic Field 32: applied magnetic field to funnel electron particles 30 toward the spacecraft when applicable. Power Control Junction 16: is an electrical node that controls and coordinates the flow of current to and from all electrical components. Thermionic Fission Cells 24: on-board power sources; 96% enriched $^{235}$U, NaK coolant; 7-10 years full-power life; non-prohibitive at 10 kg/kW. On-Board Xenon Gas 26: requires 400 kg of Xe per month. Electron Injector and Ionizer 18: converts electric current into free electron particles packets. Additionally this component is used to ionize xenon gas when applicable. Induction Linear Accelerator (Linac) 20: length of 1 m. Quadrupole Magnets (Part of Linac): 4-pole magnetic fields which keep the free electron packets focused. Radiator to Space 22: results in 77 K (Kelvin) allowing for space-cooled superconductivity. Xenon Ion Conduits 28: delivers Xe ions 34 rearward of vehicle for spacecraft neutralization. Exhaust Port Deflector Plates (Part of Linac): direct exiting free electrons 30 rearward of vehicle.

Applications

EPE was originally conceived of as spacecraft propulsion for manned space flight. Only later did I realize that it could be applied to other areas. Because this was the path of development I will present this evolution chronologically.

Manned Spacecraft: The performance envelope of EPE will allow it to produce a constant 1 g force (1 Earth gravity) acceleration.

$$a = \frac{qE}{m} = \frac{9.8 \times 10^6 \, N}{1 \times 10^6 \, kg} = 9.8 \text{ m/s}^2$$

According to the general theory of relativity, the human body cannot tell the difference between 1 g of gravity and 1 g resulting from thrust. Medical problems averted by this technique are space motion sickness, heart shrinkage, calcium deficiency, muscle deterioration, coordination disruption and space anemia.

The deep space environment is a source of constant background radiation (GCR Radiation). Minimizing time spent in this environment using EPE is the best way to minimize exposure. This will lower the vehicle mass requirement by reducing the amount of passive radiation shielding required for the crew module to meet the 5 rem/year radiation limitation imposed by NASA special report SP-413. Based on the above arguments EPE is the absolute best option for manned in-space travel.

Given constant 1 g force acceleration, a vehicle will reach near light speed in 1 year if the acceleration remains constant. This makes EPE a potential candidate for interstellar travel.

EPE was designed from inception to reach a high relativistic velocity. Relativistic effects are defined by γ, between two inertial reference frames of differing velocities.

$$\gamma = \frac{1}{\sqrt{1 - \frac{v^2}{c^2}}}$$

However, while the reference frame system is accelerating this effect is more intimidatingly represented by γ$^3$. The following is the equation for EPE traveling at 0.99 c at 1 g.

$$a = \frac{qE}{\gamma^3 m_0} = \frac{(358\ C)(9.8 \times 10^6\ N/C)}{(7.1)^3(1 \times 10^6\ \text{kg})} = 9.8\ \text{m/s}^2$$

Kinetic Energy Missile: EPE was simultaneously designed for use with an exploration spacecraft and a comet/asteroid destroying kinetic energy missile to protect the Earth. The exact kinetic energy output of an EPE vehicle when striking a planet-threatening object at 99% the speed-of-light is described by the equation below.

$$K = \frac{m_0 c^2}{\sqrt{1-\frac{v^2}{c^2}}} - m_0 c^2$$

The resulting explosion given for a vehicle of $1 \times 10^6$ kg, traveling at 0.99 c, will be a kinetic energy yield of $5.5 \times 10^{23}$ J, which is the equivalent of 134,623,943 megatons of TNT.

Gravity Telescope: To define the curvature of the movement of the universe accurately, a better space telescope is required. Such a telescope must exceed the current generation of space telescopes.

A solution can be found by using the Sun as a lens. As described by general relativity, gravity bends space. As such, the Sun can be used to create a gravitational lens telescope. The basic geometry of the gravitational lens of the Sun has the minimal focal length at 550 AU (astronomical units), where the light rays are brought to a focus. If a spacecraft were placed at this distance it would result in the most phenomenal telescope one can imagine. The Sun would act just like a regular lens, 1 million miles in diameter!

Such a telescope would have the collecting area of 30,000 Arecibo telescopes. It would be better than any radio or optical telescope you can imagine by a huge margin. The distance of 550 AU is approximately 14 times the distance to dwarf planet Pluto. However to get great, sharp images the spacecraft will have to be placed at 700 AU.

The reason this has not been attempted in the past is that propulsion technology has been an unsolvable barrier. The farthest reaching spacecraft to date is the Voyager I. As of February 2012, it was at 120 AU from the Sun. It has been in space for about 30+ years, and is roughly ⅕ of the way to 550 AU. At its current rate of travel, it will not reach 550 AU for more than a century. What is needed to make a gravitational telescope work is phenomenal propulsive performance.

With the knowledge that EPE can produce a spacecraft that can provide a constant acceleration of 1 g, the problem is solvable. The integrated application of an Electron Propulsion Engine towing a space observatory is novel, and a new concept previous unconsidered. To determine the performance characteristics of sending a spacecraft to the location 550 AU, I assumed a constant acceleration, followed by a constant deceleration. This process was repeated for 700 AU.

550 AU=67 days

700 AU=76 days

Hypothetically, with given constraints the estimated time of approximately two months to two and a half months results. Thus, a gravitational lens telescope enabling spacecraft can be placed in any direction in less than three months with an Electron Propulsion Engine!

So if you are looking for high redshift supernovae (specifically type Ia supernovae) you don't care where you point, they're everywhere. You just point at some nice black piece of space, take really deep pictures, and wait for the supernovae to start showing up. The result of this endeavor would be the best observational technology imaginable by the human mind. Thus, with this technology astrophysicists could observe highly red shifted supernovae, and continue research into the effects of dark energy.

At present there is an active search for exoplanets. However, if a good candidate for a world containing astrobiology is found, the opportunities for following up on that discovery are limited. Additionally, if such a candidate world were suspected of containing extraterrestrial intelligence, than the follow up options are even more limited.

One of the best ways to detect the presence of an extraterrestrial civilization on an exoplanet is through light signals. However, viewing the lights of an exoplanet's cities at night requires an optical telescope of 5 km in diameter. Currently, the maximum size is approximately 10 m.

The resultant resolution of an Electron Propulsion Engine created gravity telescope would be high enough to detect exoplanets and photograph them in detail, and detect city lights. It would also have to ability to amplify outgoing signals potentially by tens of thousands of times, theoretically allowing contact. The result of this endeavor would be the best observational technology imaginable by the human mind. Ideally the resultant product would be a poster-quality picture of "another" Earth around an alien star.

The invention claimed is:

1. An electron accelerator including:
   onboard xenon storage containing xenon;
   thermionic fission cells for generating electricity;
   an electron injector for converting electricity into free electron packets;
   a linear accelerator for accelerating said free electron packets converted by said electron injector;
   a linear electron path through said linear accelerator for acceleration of said free electron packets.

2. The electron accelerator as set forth in claim 1 wherein:
   said linear accelerator is in the form of a series of electron acceleration modules;
   a quadrupole magnet positioned between a pair of electron acceleration modules among said series of electron acceleration modules to control and vector said free electron packets path.

3. The electron accelerator as set forth in claim 1 wherein:
   said electron injector is positioned at a front end of said linear accelerator for converting said electricity into free electron packets for acceleration in said linear accelerator.

4. The electron accelerator as set forth in claim 1 wherein:
   a power control junction is positioned at a front end of said linear accelerator to control current flowing to and from all electrical components within said electron accelerator.

5. The electron accelerator as set forth in claim 1 wherein:
   electron deflector plates are positioned at an exit from said electron accelerator for controlling a direction of said free electron packets after the free electron packets leave said electron accelerator.

6. The electron accelerator as set forth in claim 1 wherein:
   a power control junction is positioned before said electron injector to control current flowing to and from all electrical components within said electron accelerator.

7. The electron accelerator as set forth in claim 6 wherein:
electron deflector plates are positioned at an exit from said electron accelerator for controlling the direction of said free electron packets after the free electron packets leave said electron accelerator.

8. The electron accelerator as set forth in claim 1 including:
an electromagnetic scoop coil providing electrons to be accelerated.

9. A vehicle propulsion process including:
providing a vehicle having an electron accelerator according to claim 1;
converting electricity into free electron packets with the electron injector;
accelerating said free electron packets with said linear accelerator;
propelling said vehicle by a reaction force from said accelerating.

10. The vehicle propulsion process as set forth in claim 9 including:
generating electrons using xenon gas ionization;
expelling xenon ions by way of xenon ion conduits, such that the vehicle remains charge neutral.

11. The vehicle propulsion process as set forth in claim 9 including:
collecting electrons via an electromagnetic SCOOP coil, such that the vehicle remains charge neutral.

* * * * *